(12) United States Patent
Bischofberger et al.

(10) Patent No.: US 11,492,997 B2
(45) Date of Patent: Nov. 8, 2022

(54) PISTON FOR AN INTERNAL COMBUSTION ENGINE

(71) Applicant: Mahle International GmbH, Stuttgart (DE)

(72) Inventors: Ulrich Bischofberger, Esslingen (DE); Ralf Braig, Schorndorf (DE); Kai Schreer, Wiernsheim (DE); Ioan Stefan, Stuttgart (DE)

(73) Assignee: Mahle International GmbH

( * ) Notice: Subject to any disclaimer, the term of this patent is extended or adjusted under 35 U.S.C. 154(b) by 0 days.

(21) Appl. No.: 17/378,654

(22) Filed: Jul. 16, 2021

(65) Prior Publication Data

US 2022/0034280 A1 Feb. 3, 2022

(30) Foreign Application Priority Data

Jul. 17, 2020 (DE) .......................... 102020208998.1

(51) Int. Cl.
*F02F 3/28* (2006.01)
*F16J 9/20* (2006.01)

(52) U.S. Cl.
CPC ................. *F02F 3/28* (2013.01); *F16J 9/206* (2013.01)

(58) Field of Classification Search
CPC ....... F02F 3/28; F16J 9/206; F16J 1/08; B23P 15/10; B21K 1/18
See application file for complete search history.

(56) References Cited

U.S. PATENT DOCUMENTS

| 5,359,922 A * | 11/1994 | Martins Leites .... B23K 20/129 29/888.042 |
| 5,737,999 A * | 4/1998 | Ariga .......................... F16J 1/08 123/193.6 |
| 9,062,768 B2 * | 6/2015 | Azevedo .................. F16J 9/062 |
| 2004/0237775 A1 * | 12/2004 | Dunaevsky .............. F16J 9/206 92/160 |

(Continued)

FOREIGN PATENT DOCUMENTS

| CN | 105422306 A | 3/2016 |
| DE | 884 586 C | 7/1953 |
| DE | 102005041908 A1 | 3/2007 |

(Continued)

OTHER PUBLICATIONS

Machine translation, Detailed Description of JP2001214804A, Kasai et al., obtained from https://worldwide.espacenet.com/, pp. 1-5. (Year: 2001).*

(Continued)

*Primary Examiner* — Grant Moubry
(74) *Attorney, Agent, or Firm* — Fishman Stewart PLLC

(57) ABSTRACT

A piston for an internal combustion engine may include a ring belt, a groove, and an additional groove. The ring belt may extend along an axial direction. The groove may be arranged on the outer circumference of the ring belt and may be configured to receive an oil scraper ring. The additional groove may be arranged on the outer circumference spaced apart from the groove with respect to the axial direction. The additional groove may include a first groove side axially facing away from the groove and a second groove side axially facing the groove. The first groove side may include an axial step.

20 Claims, 2 Drawing Sheets

(56) References Cited

U.S. PATENT DOCUMENTS

2005/0087153 A1    4/2005  Moon
2008/0314241 A1*  12/2008  Buschbeck ................ F16J 1/09
                                                           92/222

FOREIGN PATENT DOCUMENTS

DE   102017202463  A1   8/2018
JP       2001-214804  A   8/2001
JP        2002-13441  A   1/2002

OTHER PUBLICATIONS

English abstract for DE-2002-13441.
English abstract for CN-105422306.
English abstract for JP-2001-214804.
German Search Report for DE-102020208998.1, dated Jan. 4, 2021.
European Search Report dated Nov. 22, 2021 for copending European Patent App. No. EP21185269.

* cited by examiner

PISTON FOR AN INTERNAL COMBUSTION ENGINE

CROSS-REFERENCE TO RELATED APPLICATIONS

This application claims priority to German Patent Application No. DE 10 2020 208 998.1, filed on Jul. 17, 2020, the contents of which is hereby incorporated by reference in its entirety.

TECHNICAL FIELD

The invention relates to a piston for an internal combustion engine and to an internal combustion engine having such a piston. Finally, the invention also relates to a method for producing such a piston.

BACKGROUND

Pistons for internal combustion engines typically comprise a ring belt in which, besides grooves for receiving compression rings, also a receiving groove for receiving an oil scraper ring can be formed. Such a receiving groove—in the following referred to as "groove" for the sake of simplicity—can be provided axially on an outer circumferential surface or an outer circumference of the axial region of the piston forming the ring belt. The oil scraper ring arranged in this groove serves for scraping off oil accumulated on the cylinder running surface, so that it can be returned to a crankcase of the internal combustion engine. If oil is to be also conducted to the skirt surface of the piston skirt axially following the ring belt, it is known to provide a further additional groove in addition to the receiving groove for the oil scraper ring axially spaced apart from the same, in which oil that drains from the oil scraper ring can be collected.

Such additional grooves are described for example in JP 2002013441 A and in US 2005/0087153 A1.

SUMMARY

It is an object of the present invention to show new ways in the development of pistons that are equipped with an additional groove introduced above. In particular, solutions are to be found with which the return of collected oil into the crankcase with the help of the additional groove is improved. With such a solution, the additional groove is to be particularly easily producible at the same time.

Accordingly, the basic idea is equipping with an axial step, for the particularly effective collecting of oil, the groove side of the additional groove facing away from the groove for the oil scraper ring—which is referred to as "first groove side" in the following. Experimental investigations have shown that such an axial step brings about that oil can be particularly extensively scraped off by the oil scraper ring in the additional groove and thus collected, from where it can then be again returned into the crankcase.

Such an additional groove with an axial step formed on the first groove side is very easily produced since in a first step the actual additional groove can be created by removing piston material and—in a second step—by subsequently creating a "widening"—by means of removal of further piston material—with a lower groove depth than with the additional groove originally created in the first step—the desired axial step can be created in the groove side of the additional groove. A separate, additional manufacturing step for creating the axial step that is substantial for the invention can thus be omitted.

A piston for an internal combustion engine according to the invention, in particular for a motor vehicles, comprises a ring belt extending along an axial direction. On the outer circumference of the piston, a groove circulating along the circumferential direction of the piston can be formed for receiving an oil scraper ring. Further grooves for receiving compression rings can likewise be provided. Furthermore, the piston comprises an additional groove arranged on the outer circumference axially spaced apart from the groove and likewise circulating in the circumferential direction of the piston, which comprises a first groove side axially facing away from the groove for receiving the oil scraper ring and a second groove side axially facing this groove. The two groove sides can be interconnected by a groove bottom in the known manner which preferably extends in the axial direction. The said additional groove is arranged axially on a side of the groove facing away from the piston crown or fire land of the piston, which serves for receiving the oil scraper ring. According to the invention, the first groove side of the additional groove, comprises an axial step in particular in a longitudinal section along the axial direction. It is to be understood that the term "axial step" does not exclusively prescribe a strictly axial course of the step—i.e. parallel to the axial direction—which in this case has a cylindrical shape, but can additionally include axial courses and corresponding shapes of the step deviating from that. Thus, the axial step can be in particular formed slightly conically.

According to a preferred embodiment, a first side height of the first groove side measured along a radial direction of the ring belt is greater than a second side height of the second groove side likewise measured along the radial direction. In this way it is ensured that in an axial portion of the piston or of the ring belt that is arranged between the groove and the additional groove, with the piston mounted in the cylinder, an intermediate space is formed between the outer circumference of the piston or of the ring belt and the cylinder running surface, through which oil can flow from the groove with the oil scraper ring to the additional groove.

According to an advantageous further development, the first groove side comprises a radially inner side portion, which radially to the outside via the axial step merges into a radially outer side portion. In this further development, a portion height of the radially inner side portion measured along the radial direction of the ring belt is equal to the second side height. This version is very easily producible since the axial step and a radial ring rib axially delimited by the second groove side can be simultaneously produced in one and the same manufacturing step—by radially removing the piston material concerned. The side portions can be formed conically.

According to a further preferred embodiment, a radius of the ring belt measured along a radial direction of the ring belt is smaller in a first axial portion, which is arranged axially between the groove and the additional groove, than in a second axial portion, which axially follows the additional groove on a side facing away from the groove.

Practically, the first axial portion forms a ring rib circulating on the outer circumference of the ring belt. This ring rib is axially delimited by the additional groove, in particular by the second groove side of the same and by the groove for receiving the oil scraper ring.

According to an advantageous further development, the ring rib comprises at least one oil channel, which fluidically connects the groove with the additional groove. In this way, oil collected with the help of the oil scraper ring in the groove can be passed on to the additional groove and from there returned to the crankcase of the internal combustion engine. Preferably, two or more such oil channels are arranged along the circumferential direction, particularly preferably spaced apart from one another.

Practically, the at least one oil passage can be formed by a blind hole. This version is particularly cost-effectively producible.

Practically, the axial step of the first groove side is formed by a first step portion extending along the axial direction, which at a 90° angle merges into a second step portion extending along the radial direction. This embodiment can also be produced in a particularly simple manner. In versions, an obtuse or acute angle can also be provided instead of a right angle.

A further advantageous development according to which the radially inner side portion of the second groove side comprises the second step portion, or is the second step portion, proves to be particularly easy to produce. In a further development, the first step portion preferably merges into the radially outer side portion by means of a rounding.

Particularly preferably, the rounding has an inner radius of 0.25 mm to 1.0 mm, particularly preferably an inner radius of approximately 0.5 mm.

Practically, a groove bottom formed between the two groove sides can extend along the axial direction.

Particularly practically, a distance on the outer circumference of the piston measured along the axial direction between the first and the second groove side of the additional groove can be greater than an extension of the groove bottom of this additional groove likewise measured along the axial direction.

Particularly practically, a transition from the groove bottom into the first and/or second groove side can be formed by a rounding, which preferentially has an inner radius of 0.25 mm to 1.0 mm, particularly preferably an inner radius of approximately 0.5 mm.

The invention, furthermore, relates to an internal combustion engine, in particular for a motor vehicle, having a piston according to the invention introduced above, so that the advantages of the piston according to the invention explained above also apply to the internal combustion engine according to the invention. Here, the internal combustion engine comprises a cylinder with a cylinder running surface in which the piston is movably guided in such a manner that the first axial portion of the ring belt of the piston is arranged between the groove and the additional groove spaced apart from the cylinder running surface.

Finally, the invention relates to a method for producing the piston according to the invention, so that the advantages of the piston according to the invention explained above also apply to the method according to the invention.

Further important features and advantages of the invention are obtained from the sub-claims, from the drawing and from the associated figure description by way of the drawing.

It is to be understood that the features mentioned above and still to be explained in the following cannot only be used in the respective combination stated, but also in other combinations or by themselves without leaving the scope of the present invention.

Preferred exemplary embodiments of the invention are shown in the drawings and are explained in more detail in the following description, wherein the same reference numbers relate to same or similar or functionally same components.

BRIEF DESCRIPTION OF THE DRAWINGS

It shows, in each case schematically.

DETAILED DESCRIPTION

Figure 1:
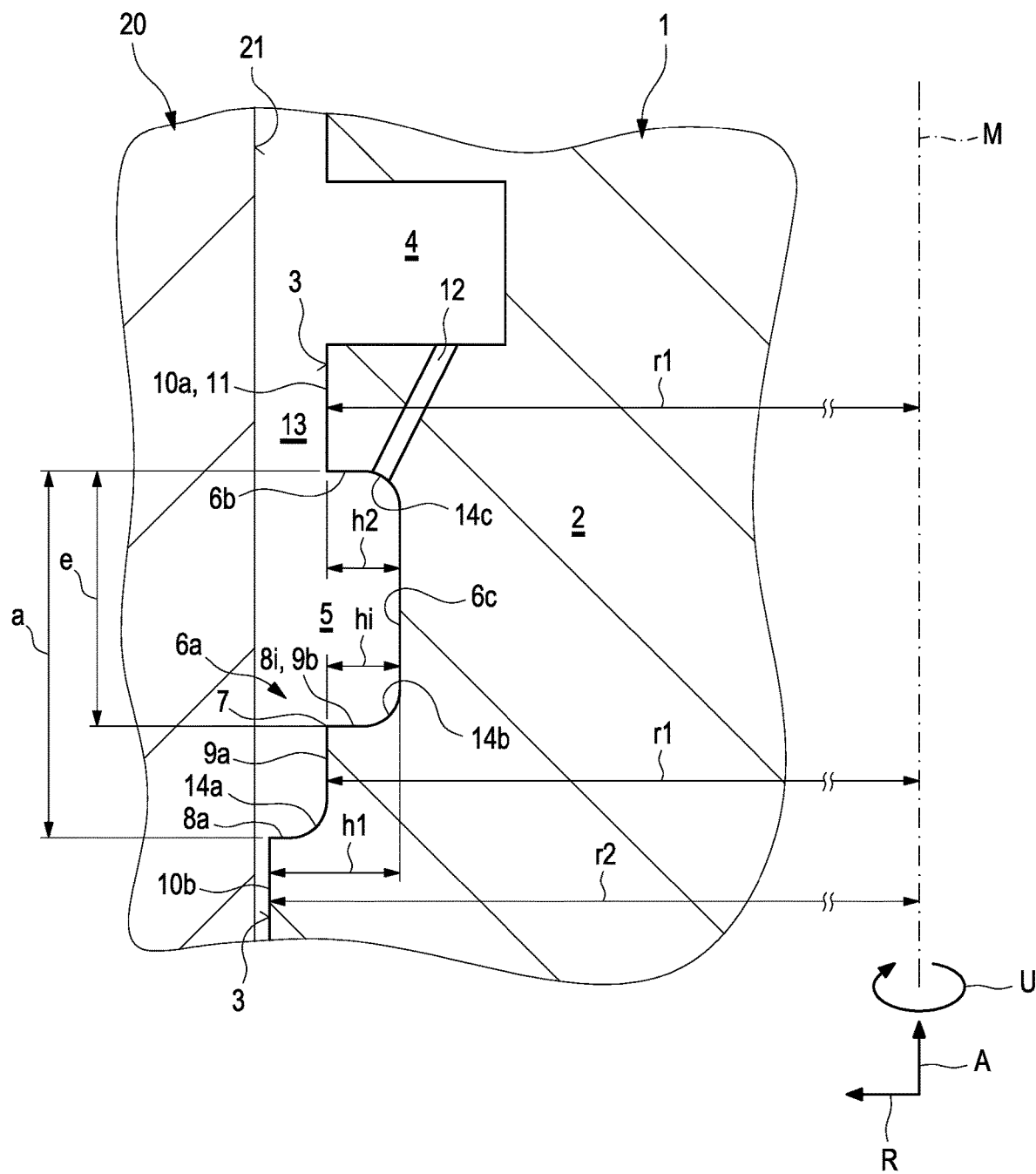
FIG. 1 shows in a detailed representation a section of an example of a piston according to the invention.

FIG. 1 shows in a detailed representation of a section an example of a piston 1 according to the invention. The piston 1 is part of an internal combustion engine which is not shown in more detail, which comprises a cylinder 20 in which the piston 1 is moveably arranged. There, the piston 1 slides along a cylinder running surface 21 of the cylinder 20 in a conventional manner.

The piston 1 extends along an axial direction A—FIG. 1 is a longitudinal section along this axial direction A—and besides a fire land which is not shown, and a piston skirt which is likewise not shown in more detail, comprises a ring belt 2, which is shown in FIG. 1 by way an extract in the region of an outer circumference 3 of the piston 1 in the axial region of the ring belt 2. In the axial region of the ring belt 2 of the piston 1, a groove 4 is formed on the outer circumference 3 of the same, which serves for receiving an oil scraper ring (not shown).

As is evident from FIG. 1, a further groove, the so-called additional groove 5 is arranged along the axial direction A spaced apart from the groove 4. Both the groove 4 and also the additional groove 5 are a radial groove, which, along a radial direction R of the piston 1, is formed open towards the outer circumference 3 of the same. The radial direction R extends away orthogonally from a centre longitudinal axis M of the piston 1, along which the axial direction A extends. Both the groove 4 and also the additional groove 5 run along the outer circumference 3, along a circumferential direction U, which extends both perpendicularly to the axial direction A and to the radial direction R round about the centre longitudinal axis M of the piston 1.

In the following, the geometry of the additional groove 5 is explained in detail by way of the FIG. 1. According to FIG. 1, the additional groove 5 comprises a first groove side 6a facing away from the groove 4 and a second groove side 6b axially facing the groove 4. The two groove sides 6a, 6b are interconnected through a groove bottom 6c, which extends in the example along the axial direction (A between the two groove sides 6a, 6b. The first groove side 6a comprises an axial step 7.

This first groove side 6a comprises a radially inner side portion 8i, which radially along the radial direction R, via the axial step 7, merges into a radially outer side portion 8a.

The axial step 7 of the first groove side 6a is formed by an axially extending first step portion 9a, which along the axial direction A radially to the inside merges into a second step portion 9b at a 90° angle extending along the radial direction R. The second step portion 9b can be identical to the radially inner side portion 8i or be part of the radial inner side portion 8i.

Starting out from the groove bottom 6c, the first groove side 6a—in the longitudinal section shown in FIG. 1—comprises the radial inner side portion 8i extending along the radial direction R radially to the outside, which forms the second step portion 9b and at a right angle merges into the first step portion 9a extending along the axial direction away from the second groove side 6b. The first step portion 9a merges for example at a 90° angle into the radially outer side portion 8a, which extends along the radial direction R and ends at the outer circumference 3.

It is noted that in an alternative manner of viewing the axial step 7 of the first groove side 6a can be interpreted as radial step of the groove bottom 6c.

A first side height h1 of the first groove side 6a measured along a radial direction R of the ring belt 2, as shown in FIG. 1, is greater than a second side height h2 of the second groove side 6b likewise measured along the radial direction R. A portion height hi of the radially inner side portion 8i measured along the radial direction R of the piston 1 or the ring belt 2 of the same is equal to the second side height h2, i.e. h1=h2. Contrary to the example shown in FIG. 1, the side portions 8a, 8i can be formed conically. There, the outer circumference 3 in the region of at least one of the side portions 8a, 8i, viewed in the longitudinal section along the axial direction A, can be set at an angle of 45-90°, for example 60°, relative to the axial direction.

An axial portion of the ring belt 2 or of the outer circumference 3 arranged axially between the groove 4 and the additional groove 5, which in the following is referred to as "first axial portion" 10a, forms a ring rib 11 projecting radially to the outside. This ring rib arranged axially between the groove 4 and the additional groove 5, like the groove 4 and the additional groove 5, circulates along the circumferential direction U.

A radius r1 of the ring belt 2 of the piston 1 in the first axial portion 10a between the groove 4 and the additional groove 5 measured along the radial direction R of the ring belt 2 is smaller than the radius r2 measured along the radial direction R of the ring belt 2 in a second axial portion 10b, which axially follows the additional groove 5 on a side facing away from the groove 4. Thus, r1<r2 applies. Both radii r1, r2 are measured between the outer circumference 3 and the centre longitudinal axis M of the piston 1.

Compared with this, the piston 1 in the axial region of the ring belt 2 between the groove 4 and additional groove 5, i.e. in the first axial portion 10a, has the same radius r1 measured along the radial direction R between outer circumference 3 and centre longitudinal axis M, as in the region of the axial step 7 or in the region of the first step portion 9a of the axial step 7. In this way, the piston 1 can be moveably guided in the cylinder 20 in such a manner that the first axial portion 10a, i.e. the ring rib 11 of the ring belt 2, is arranged between the groove 4 and the additional groove 5 with respect to the radial direction R spaced apart from the cylinder running surface 21. Through the intermediate space 13 thus formed, oil can thus flow from the groove 4 with the oil scraper ring to the additional groove 5.

A distance a measured on the outer circumference 3 along the axial direction A between the first and the second groove side 6a, 6b is greater than an extension e of the groove bottom 6c likewise measured along the axial direction A.

As is additionally evident from FIG. 1, the first axial portion 10a forms a ring rib 11 circulating on the outer circumference 3 in the circumferential direction U of the ring belt 2. According to FIG. 1, an oil channel 12 can be formed in the ring rib 11, which fluidically connects the groove 4 with the additional groove 5. Obviously, multiple such oil channels 12, which are then preferably arranged along the circumferential direction U spaced apart from one another, can be provided. The oil channel 12 or the oil channels 12 can be formed by a respective blind bore. In this way, oil cannot only be conducted via the intermediate space 13, but also via the respective oil channel from the groove 4 to the additional groove 5.

As is noticeable from FIG. 1, the first step portion 8a can merge via a first rounding 14a into the outer circumference 3. Practically, the first rounding 14a can have an inner radius of 0.25 to 1.0 mm, particularly preferably of approximately 0.5 mm. A respective transition from the groove bottom 6c into the first and second groove side 6a, 6b is formed by a second and third rounding 14b, 14c respectively, which, like the first rounding 14a, practically can have an inner radius of 0.25 mm to 1.0 mm, preferably of approximately 0.5 mm.

Producing the piston according to the invention explained above can take place in accordance with the method according to the invention with the measures a) to c), which is exemplary explained in the following: According to a first measure a), a piston blank is provided in which the groove 4 explained above for receiving an oil scraper ring is already present. According to a second measure b), the additional groove 5 with the first and second groove side 6a, 6b as described above, however, as yet without the axial step 7 that is substantial for the invention, is produced on the outer circumference 3 in the region of the ring belt 2 of the piston blank in that piston material is removed there.

According to a third measure c), the piston 1 according to the invention is produced by creating the axial step 7. For this purpose, piston material is simultaneously removed in the additional groove 5 and in the axial region between the groove 4 and the additional groove 5, i.e. in the first axial portion 10a.

The removal of piston material in measure c) is preferably effected in such a manner that following the removing of piston material according to measure c), the piston 1, in the axial region between groove 4 and additional groove 5, i.e. in the first axial portion 10a, has a radius measured along the radial direction R between outer circumference 3 and centre longitudinal axis M with the same value r1 as in the region of the axial step 7 or in the region of the first step portion 9a.

Figure 2:
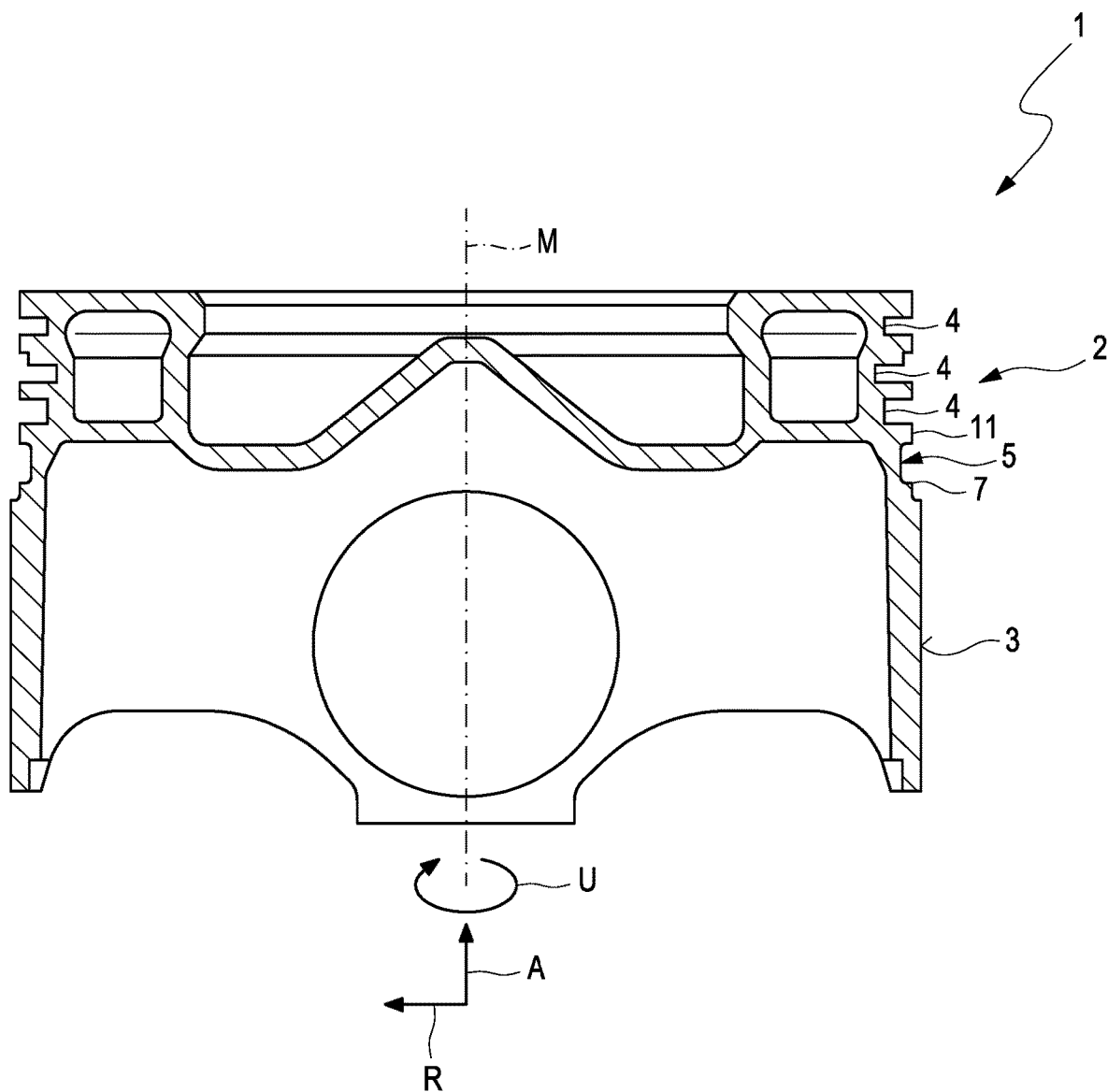
FIG. 2 shows a sectional representation of a further example of a piston according to the invention.

In FIG. 2, a sectional representation of a further example of a piston 1 according to the invention is shown. The piston 1 of FIG. 2 corresponds, with respect to its additional groove 5, substantially to that of FIG. 1. There, it is evident from FIG. 2, that in the axial region of the ring belt 2 of the piston 1, for example, three grooves 4 can be formed on the outer circumference 3 of the same, which serve for receiving a piston ring each (not shown). The piston ring that can be received in the groove 4 located next to the additional groove 5 can be an oil scraper ring. The piston rings that can be received in the remaining grooves 4 can be compression rings.

The invention claimed is:
1. A piston for an internal combustion engine, comprising:
a ring belt extending along an axial direction;
a groove arranged on an outer circumference of the ring belt, the groove configured to receive an oil scraper ring;
an additional groove arranged on the outer circumference spaced apart from the groove with respect to the axial direction, the additional groove including a first groove side axially facing away from the groove and a second groove side axially facing the groove;
wherein the first groove side includes an axial step;
wherein the axial step includes an axially extending first step portion and a radially extending second step portion;
wherein the groove and the additional groove are axially separated from one another via a radially protruding ring rib; and
wherein the first step portion and a radially outward facing end of the ring rib are substantially coplanar.

2. The piston according to claim 1, wherein a first side height of the first groove side measured along a radial direction is greater than a second side height of the second groove side measured along the radial direction.

3. The piston according to claim 2, wherein:
the first groove side includes a radially inner side portion and a radially outer side portion, the radially inner side portion merging via the axial step into the radially outer side portion in a radially outward direction; and
a portion height of the radially inner side portion measured along the radial direction is equal to the second side height of the second groove side.

4. The piston according to claim 1, wherein a radius of the ring belt measured along the radial direction is smaller in the ring rib than in a second axial portion which on a side facing away from the groove axially follows the additional groove.

5. The piston according to claim 4, wherein the ring rib extends circumferentially around the outer circumference of the ring belt.

6. The piston according to claim 5, wherein the ring rib includes at least one oil channel that fluidically connects the groove with the additional groove.

7. The piston according to claim 1, wherein the first step portion merges at a 90° angle into the second step portion.

8. The piston according to claim 7, wherein:
the first groove side includes a radially inner side portion and a radially outer side portion;
the radially inner side portion includes the second step portion; and
the first step portion, via a rounding, merges into the radially outer side portion.

9. The piston according to claim 8, wherein the rounding has an inner radius of 0.25 to 1.0 mm.

10. The piston according to claim 1, wherein the additional groove further includes a groove bottom extending in the axial direction between the first groove side and the second groove side.

11. The piston according to claim 10, wherein a distance measured on the outer circumference along the axial direction between the first groove side and the second groove side is greater than an extension of the groove bottom measured along the axial direction.

12. The piston according to claim 10, wherein a transition from the groove bottom into at least one of the first groove side and the second groove side is formed by a rounding.

13. The piston according to claim 1, wherein:
the additional groove further includes a groove bottom extending in the axial direction between the first groove side and the second groove side;
the first groove side includes a radially outer side portion that merges into the first step portion via a first rounded transition; and
the second step portion (i) defines a radially inner side portion of the first groove side and (ii) merges into the groove bottom via a second rounded transition.

14. The piston according to claim 13, wherein at least one oil channel extends from the groove to the additional groove at least partially through the ring rib, the groove and the additional groove in fluid communication with one another via the at least one channel.

15. The piston according to claim 1, wherein:
the first groove side includes a radially inner side portion and a radially outer side portion;
the radially inner side portion merges via the axial step into the radially outer side portion in a radially outward direction; and
the radially inner side portion and the radially outer side portion are structured conically.

16. The piston according to claim 15, wherein at least one of (i) a conical surface of the radially inner side portion and (ii) a conical surface of the radially outer side portion extends obliquely relative to the axial direction and defines an angle of 45° or more relative to the axial direction.

17. An internal combustion engine, comprising:
a piston;
a cylinder having a cylinder running surface;
the piston including:
a ring belt extending along an axial direction;
a groove arranged on an outer circumference of the ring belt, the groove configured to receive an oil scraper ring;
an additional groove arranged on the outer circumference spaced apart from the grove with respect to the axial direction, the additional groove including a first groove side axially facing away from the groove and a second groove side axially facing the groove;
the first groove side including an axial step;
wherein the piston is disposed in the cylinder and moveably guided therein such that a first axial portion of the ring belt, which is arranged between the groove and the additional groove is disposed spaced apart from the cylinder running surface forming an intermediate space therebetween;
wherein the axial step is formed by an axially extending first step portion that merges at a 90° angle into a radially extending second step portion;
wherein the first groove side includes a radially inner side portion and a radially outer side portion;
wherein the radially inner side portion includes the second step portion; and
wherein the first step portion merges into the radially outer side portion via a rounding.

18. The internal combustion engine according to claim 17, wherein:
the groove and the additional groove are axially separated from one another via a radially protruding ring rib; and
the first step portion and a radially outward facing end of the ring rib are substantially coplanar.

19. A method for producing a piston, comprising:
providing a piston blank having a ring belt extending along an axial direction and a groove configured to receive an oil scraper ring, the groove arranged on an outer circumference of the ring belt;
producing, via removing piston material, an additional groove on the outer circumference of the ring belt disposed spaced apart from the groove with respect to the axial direction, the additional groove including a first groove side axially facing away from the groove and a second groove side axially facing the groove; and
creating an axial step on the first groove side via simultaneously removing piston material in the additional groove and in an axial region of the ring belt disposed between the groove and the additional groove.

20. The method according to claim 19, wherein the axial step is created such that a radius of the piston in the axial region of the ring belt disposed between the groove and the additional groove is the same as in the axial step.

* * * * *